US006970104B2

(12) United States Patent
Knecht et al.

(10) Patent No.: US 6,970,104 B2
(45) Date of Patent: Nov. 29, 2005

(54) FLIGHT INFORMATION COMPUTATION AND DISPLAY

(76) Inventors: William R. Knecht, 4320 NW. 50th St., Apt. 125, Oklahoma City, OK (US) 73112; Christian Smith, 1805 Erickson St., Manhattan, KS (US) 66503-2211

(*) Notice: Subject to any disclaimer, the term of this patent is extended or adjusted under 35 U.S.C. 154(b) by 88 days.

(21) Appl. No.: 10/348,861

(22) Filed: Jan. 22, 2003

(65) Prior Publication Data
US 2004/0143393 A1 Jul. 22, 2004

(51) Int. Cl.[7] .......................... G08B 21/00; G01S 13/00
(52) U.S. Cl. ...................... 340/945; 340/963; 340/980; 701/301; 342/29
(58) Field of Search ............................... 340/525, 945, 340/961, 963, 973, 980, 970; 701/301; 342/29, 342/32

(56) References Cited

U.S. PATENT DOCUMENTS

| 4,646,244 A | * | 2/1987 | Bateman et al. ............. 701/301 |
| 4,853,700 A | * | 8/1989 | Funatsu et al. ................ 342/30 |
| 4,862,373 A | * | 8/1989 | Meng ........................... 701/208 |
| 5,058,024 A | * | 10/1991 | Inselberg .................... 701/301 |
| 5,227,786 A | * | 7/1993 | Hancock ..................... 340/961 |
| 5,420,582 A |   | 5/1995 | Kubbat et al. .............. 340/974 |
| 5,668,542 A |   | 9/1997 | Wright ........................ 340/971 |
| 5,908,464 A |   | 6/1999 | Kishigami et al. .......... 701/208 |
| 6,201,482 B1 | * | 3/2001 | Schiefele et al. ........... 340/963 |

OTHER PUBLICATIONS

Whitaker, R., Marsh, D., Schroter, H., PD/1 Final Report, Eurocontrol, DOC 96-70-24 vol. 1 of 2, Jan. 1997.
Knecht, W., Smith, K., (2001) "The manoeuvre Space: A new aid to aircraft tactical separation". In Harris, D. (ED.) Engineering Psychology and Cognitive Ergonomics, vol. Five. Aldershot: Ashgate.
Knecht, W. E., & Hancock, P.A., (1999). "Separation maintenance in high-stress free flight using a time-to-contact-based cockpit display of traffic information", Proceedings of the 43rd Annual Meeting of the Human Factors and Ergonomics Society, 26-29.

* cited by examiner

Primary Examiner—Donnie L. Crosland
(74) Attorney, Agent, or Firm—Krieg DeVault LLP; L. Scott Paynter (57) ABSTRACT

Flight information display apparatus and methods compute and display maneuver space (MS) target or ownship aircraft and conflict regions (CR) with surrounding obstacles such as traffic, weather, and terrain. The display utilizes coordinates based upon heading and altitude, and optionally also upon ground speed. Capability for selecting non-conflicting maneuvers and executing the maneuvers may be built in.

17 Claims, 9 Drawing Sheets

FLIGHT INFORMATION COMPUTATION AND DISPLAY

BACKGROUND OF THE INVENTION

1. Field of the Invention

The present invention relates to improved flight information displays. In particular, the present invention relates to improved flight information computation and displays which show the maneuver space for a target aircraft and its conflict regions with other aircraft.

2. Description of the Prior Art

Figure 1A:
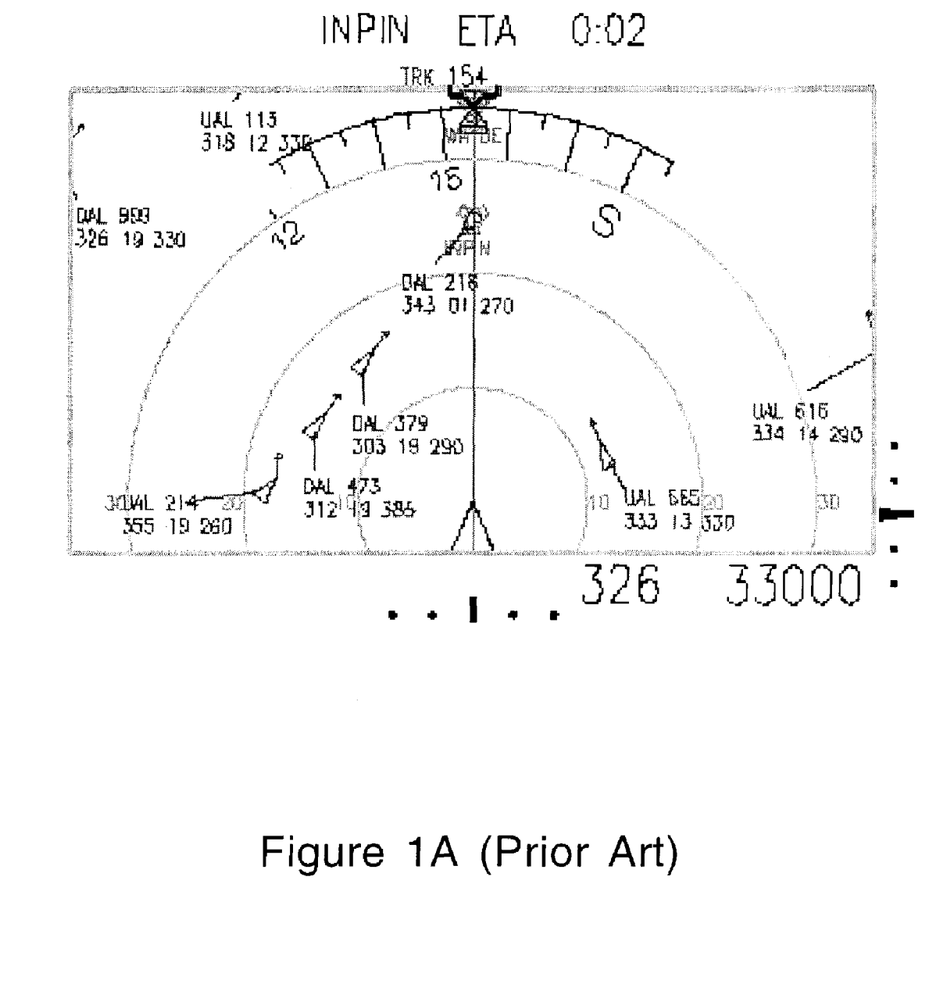
FIG. 1A (Prior Art) is a typical current cockpit display of flight information (CDTI).

FIG. 1A (Prior Art) shows a typical cockpit display of flight information (CDTI), which provides each pilot with a map view of the location of his or her own aircraft (the "ownship") and the locations of other nearby aircraft ("traffic"). A map view is simply the typical "bird's-eye" view that one would get by looking down on a scene from above. In FIG. 1A, alphanumeric data tags provide flight designator, airspeed, the first two digits of heading, and flight level (the first three digits of altitude) for all traffic. The display also includes a compass rose, heading information, waypoints, and ancillary flight parameters. In actual CDTIs, colored symbols are typically shown against a black background.

Research has shown that it can be extremely difficult to maneuver aircraft through a crowded airspace with a CDTI, or any other map view display (see, for example, Knecht & Hancock, "Separation maintenance in high-stress free flight using a time-to-contact base cockpit display of traffic information," Proceedings of the 4th Annual Meeting of the Human Factors and Ergonomics Society, 16–20, 1999; and Smith, "Shared Decision Making in the National Airspace System," Final Report, FAA Grant 93-G-048, 1998).

The primary difficulties appear to be that people are relatively ineffective at (a) predicting impending loss of separation between icons moving on flat screen displays and (b) calculating maneuver solutions to guarantee sufficient separation. Of the two problems, (b) appears the worse (Knecht & Hancock).

Figure 1B:
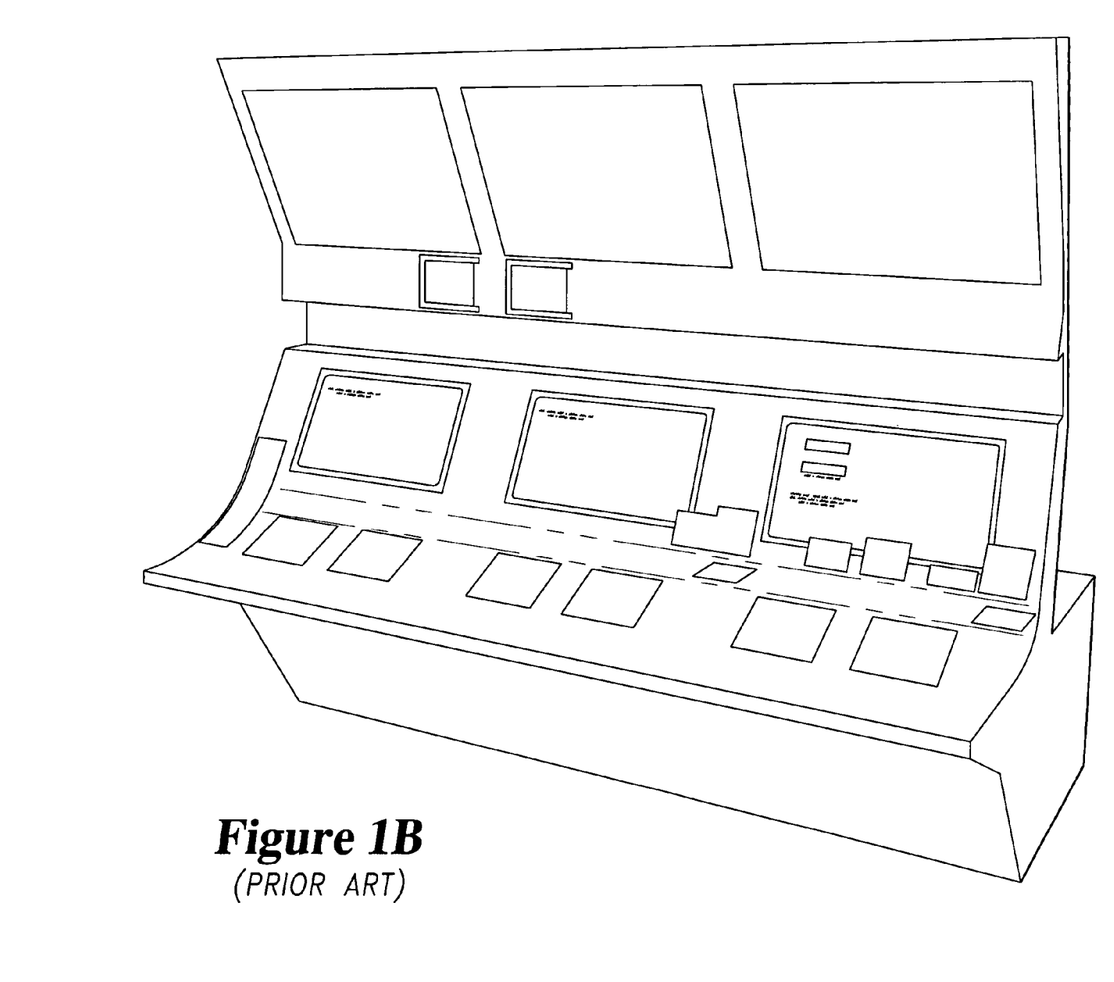
FIG. 1B (Prior Art) is a typical display screen of the Federal Aviation Administration's Display System Replacement (DSR), used by air traffic control (ATC).

FIG. 1B (Prior Art) shows the display screen of the Federal Aviation Administration's Display System Replacement (DSR). The DSR is used by Air Traffic Control (ATC) on the ground. The DSR receives composite radar and other data on the locations of aircraft and displays them in a manner similar to that used by the CDTI of FIG. 1.

Figure 2:
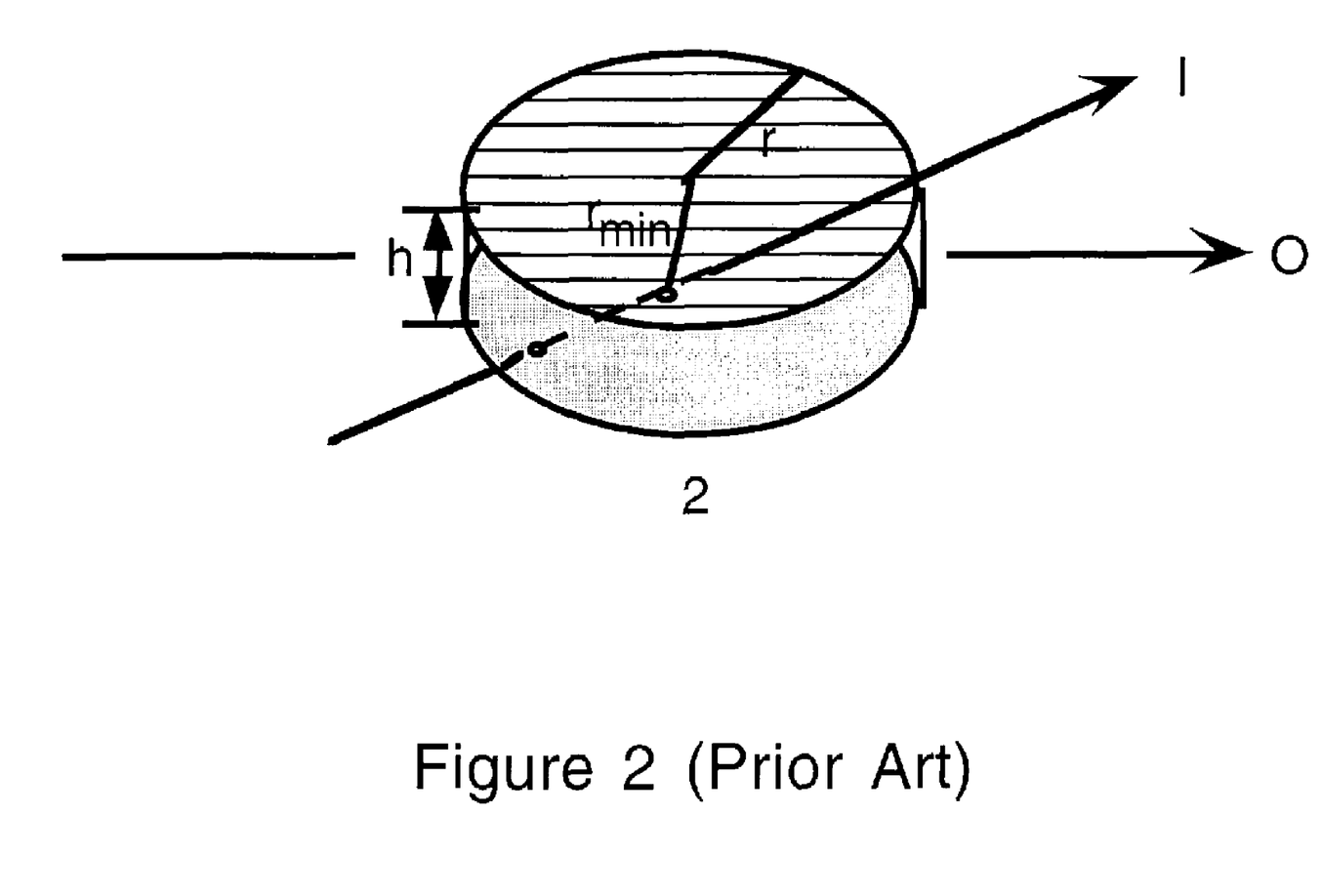
FIG. 2 (Prior Art) is an isometric drawing showing the shape of the FAA required "protected zone" for aircraft.

FIG. 2 (Prior Art) shows the shape of the FAA required "protected zone" for aircraft in the en-route flight environment. A protected zone is a cylindrical buffer region of airspace surrounding each aircraft which by law should not be entered by another aircraft. In the en-route flight environment, the radius of this zone is normally 5 nautical miles (nm), while the half height is normally either 1000 or 2000 feet, depending on altitude.

A technology called the conflict probe exists in the prior art. An example of this technology is described in Neidringhaus et al., "Automated En Route Air Traffic Control (AERA) algorithmic specifications: Vol. 3. Flight plan conflict probe," Report No. DOT/FAA/ES-83/6. Briefly, conflict probe technology is a software algorithm which takes current x, y, z positions of aircraft in the area, together with their velocities and flight plans, and "looks ahead in time" to predict their positions in space approximately 8 to 20 minutes into the future. This algorithm allows potential conflicts between aircraft to be identified far enough in advance to allow tactical avoidance maneuvers to be selected and comfortably executed.

The DSR of FIG. 1B (Prior Art), together with the protected zone of FIG. 2 and the conflict probe algorithm for predicting minimum separation between aircraft, constitute tools and concepts currently used by air traffic controllers to keep track of aircraft and maintain safe separation.

This prior art has two major limitations. First, current visual traffic information displays are, virtually without exception, map-based. Maps present one view only, and consequently are a poor method of displaying the trajectory information necessary to identify three dimensional traffic conflicts. Map displays are two-dimensional, and are therefore incapable of presenting more than a partial set of conflict-resolution solutions.

The second major limitation in the prior art is more subtle. While it seems obvious to use three-dimensional coordinates in displays, these three dimensions are not the most effective or intuitive way for pilots and air traffic controllers to note conflicts and select maneuvers. Other multidimensional representations that are more directly related to achievable maneuvers are needed.

Two needs remain in the art for improved flight information displays. First, commercial and general aviation pilots need a display which clearly and rapidly shows the entire set of maneuvers they can safely make to avoid obstacles such as traffic, weather, terrain, and special-use airspace, while still adhering to letters of agreement (LOAs) between sectors regarding how traffic will flow. Second, air traffic controllers need a similar display to augment the DSR; one which shows the maneuvers they can safely issue to a aircraft to negotiate obstacles and maintain LOAs.

SUMMARY OF THE INVENTION

A first object of the present invention is to provide improved cockpit traffic information displays which show the maneuver space for the pilots' ownship and the conflict regions with other aircraft, in a manner which simplifies the selection of maneuvers to avoid conflict.

A second object of the present invention is to provide improved ATC traffic information displays which show the maneuver space for a target aircraft and its conflict regions with other aircraft, in a manner which simplifies the selection of maneuvers to avoid conflict.

Therefore two variants of the invention are provided. The first is a cockpit display of traffic information (CDTI); the second is a ground-based variant designed for ATC.

Maneuver space (MS) is a visual representation of the "space of all possible maneuvers," meaning a physical representation of the conceptual space containing all heading/speed/altitude maneuver combinations which an aircraft is physically capable of completing within a specified period of time.

The conflict region (CR) is a similar visual representation of all heading/speed/altitude maneuver combinations which, if executed, would result in a predicted conflict with another object, including aircraft, weather, special-use airspace, and/or terrain. CRs could also could also incorporate maneuver restrictions due to letters of agreement (LOAs), which are a priori agreements between sectors to follow patterns of traffic flow judged to produce a specific result, for example, spacing aircraft for final approach to an airport. CRs could also utilize global positioning system (GPS) signals to accurately calculate position, speed, and heading.

Flight information display apparatus and methods according to the present invention compute and display maneuver space for an ownship or target aircraft and conflict regions with other aircraft. The display utilizes coordinates based upon achievable heading and altitude, and optionally also on ground speed.

Flight information display apparatus and methods according to the present invention compute and display MS for an ownship or target aircraft and CRs with other objects. The displays may have 2-D variants utilizing only heading and altitude coordinates, or 3-D variants optionally using ground speed as well.

DETAILED DESCRIPTION OF THE PREFERRED EMBODIMENT

Both ground controllers and pilots need a display of traffic information capable of incorporating and synthesizing two essential types of conflict-avoidance information. For any given aircraft predicted to be in jeopardy these two types of information are: (a) the full range of maneuvers the aircraft is physically capable of executing within the specified lookahead time, and (b) the full subset of maneuvers which would successfully resolve all predicted conflicts. In other words, we need to calculate and display a mathematical intersection set—the set of maneuvers both feasible and safe.

Designing a display that provides these two types of data required reconceptualization of not only the information-processing process, but the information-representing process as well. In order to instantiate these concepts, a "conceptual space" capable of representing all possible maneuver combinations an aircraft can make had to be defined. There are three such possible maneuver categories. An aircraft can (a) turn left or right, (b) go faster or slower, or (c) climb or descend. Therefore the chosen coordinate system of the present invention has three orthogonal axes assigned to heading, speed, and altitude respectively. All heading/speed/altitude triplets which an aircraft is capable of achieving within a specified number of minutes n are represented as a volume within this coordinate system. No common term currently exists in the aviation literature to describe this volume, which is "the space of all possible maneuvers", so the term maneuver space (MS) is defined herein to represent this volume.

Within the MS are designated a subset of volume(s) defined as conflict regions (CRs). CRs represent maneuver combinations which are predicted by the conflict probe to result in violation of the aircraft-of-interest's protected zone within the next n minutes. This violation could be made by aircraft, weather, special-use airspace, LOAs, and/or terrain. For convenience, CRs generally will be discussed herein in terms of other aircraft. For every unique object or element constituting a potential conflict there is assigned a unique CR. Given multiple conflicts, the resulting CRs may overlap within the MS.

A first preferred embodiment of the present invention is an improved cockpit display of traffic information (CDTI) which shows the MS for the pilots' ownship and the CRs with other aircraft in a manner which simplifies the selection of maneuvers to avoid conflict.

A second preferred embodiment of the present invention is an improved air traffic control (ATC) traffic information display which shows the MS for a target aircraft and its CRs with other aircraft, in a manner which also simplifies the selection of maneuvers to avoid conflict.

FIGS. 3–8 illustrate both the CDTI embodiment and the ATC embodiment. Relevant differences between the two embodiments are pointed out.

Flight information display apparatus and methods according to the present invention compute and display MS for an ownship or target aircraft and CRs with other objects. The displays may have two-dimensional variants utilizing only heading and altitude coordinates, or three-dimensional variants optionally using ground speed as well.

Figure 3:
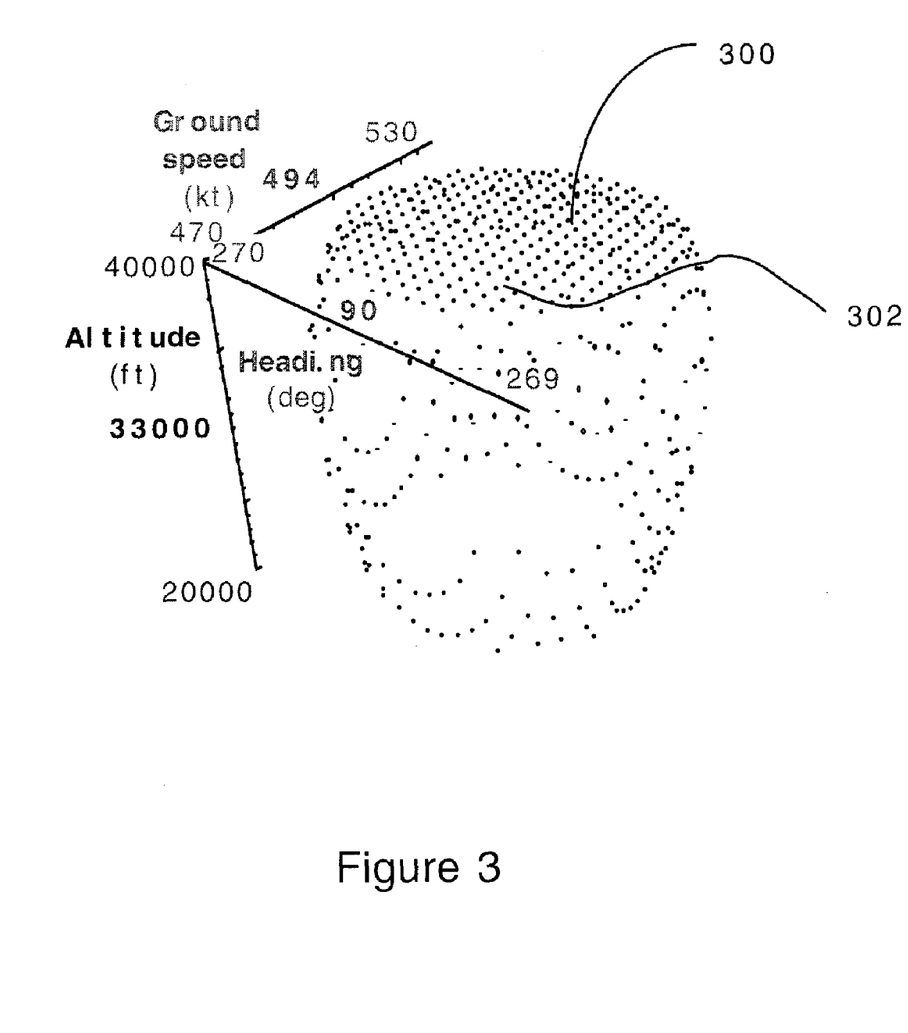
FIG. 3 is a three dimensional view of the maneuver space (MS) for an ownship or target aircraft as computed and displayed by the current invention.

FIG. 3 is a three dimensional view of maneuver space (MS) 300 for an ownship or target aircraft as computed and displayed by the current invention. It is important to emphasize that the display of FIG. 3 in no way resembles the map-view displays found in the prior art. Hence the display coordinates are not those of normal three-dimensional space. Rather, the displayed x-axis represents the range of potentially achievable headings, the y-axis represents the range of potentially achievable ground speeds, and the z-axis represents the range of potentially achievable altitudes (all achievable within a given number of lookahead minutes, n).

Figure 5:
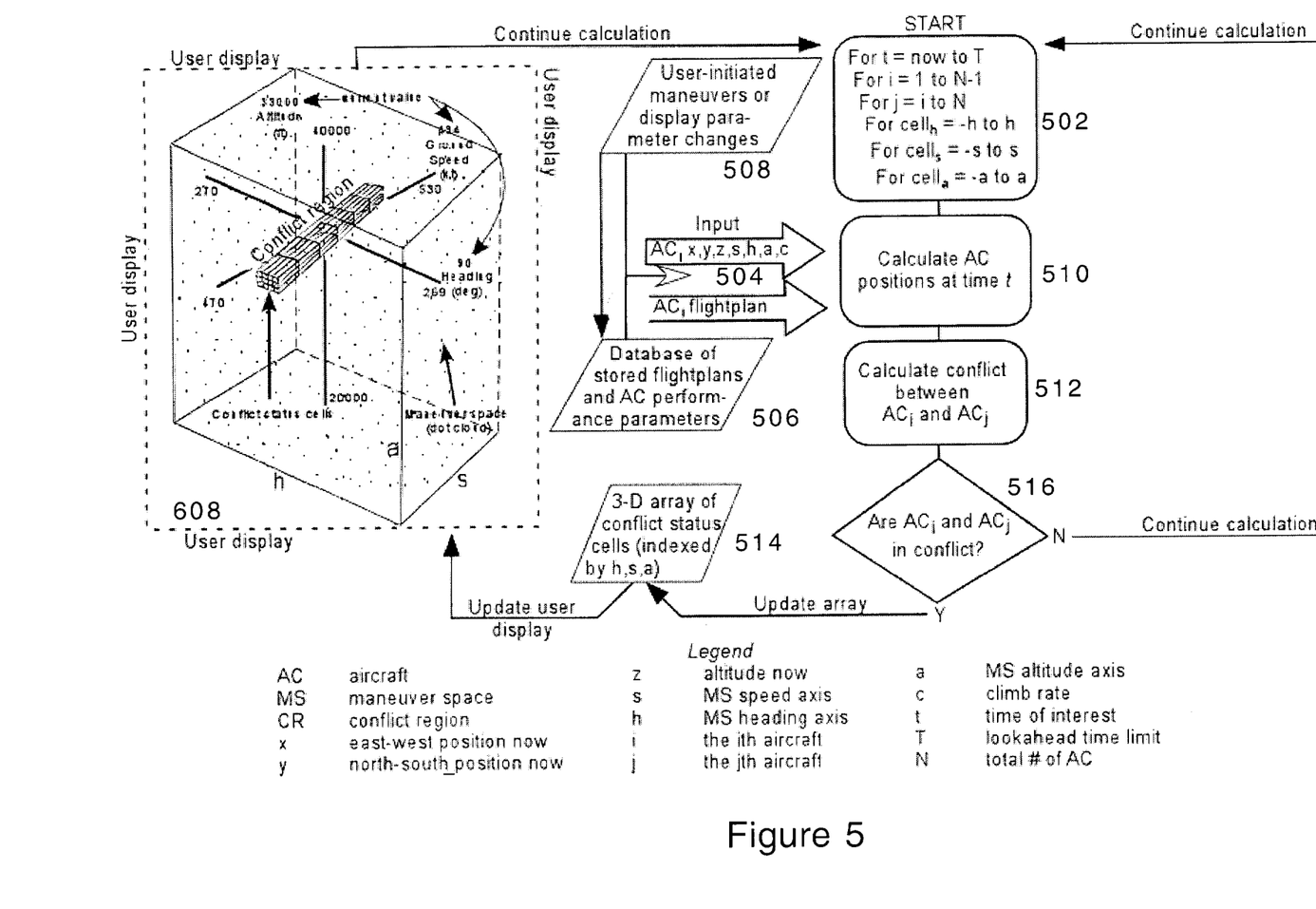
FIG. 5 is a flow chart illustrating the process of computing the maneuver space of FIG. 3 and the conflict region of FIG. 4.

The outer three-dimensional shape produced shows the range of possible aircraft maneuvers, given n minutes of lookahead time. In the example of FIG. 3, n=8 minutes. The flow chart of FIG. 5 illustrates in more detail how maneuver space 300 is computed. Briefly, the inputs are the current values of position, ground speed, and heading for the ownship or target aircraft, as well as the flight plan and aircraft type. System parameters include lookahead time, aircraft specific lookup tables containing the manufacturer's performance specifications for that aircraft, and a global list of rules concerning flight behavior, including constraints such as LOAs.

For instance, in the plot of FIG. 3, altitude has a ceiling of 40,000 feet, because the efficiency of the aircraft being modeled decreases rapidly above this altitude. Similarly, speed in the FIG. 3 plot is limited to approximately 0.85 mach, because commercial pilots usually prefer to maintain speed close to the most efficient range for which the aircraft engines were designed. Obviously, these limits are to be individualized as appropriate. In a preferred embodiment, the manufacturer's type of aircraft would suffice as input, and the other necessary and sufficient performance and airspace parameters would, for instance, either be rapidly retrieved from a lookup table specific to that airplane type, or else rapidly computed on the basis of information either supplied by radio datalink or the like, or stored onboard in table form.

Figure 4:
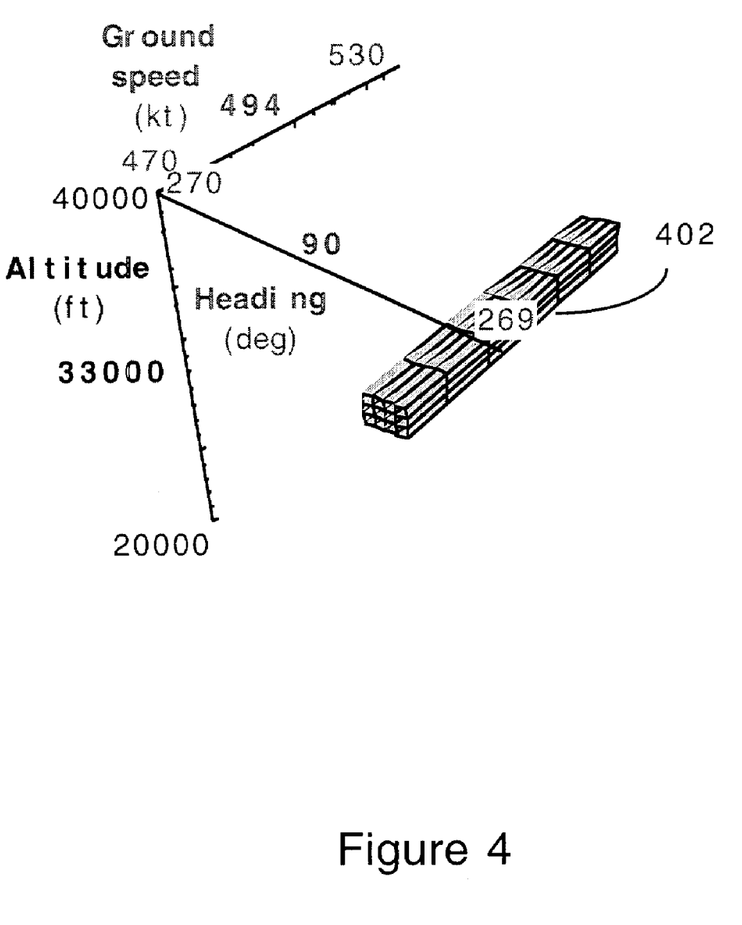
FIG. 4 is a three dimensional view of a conflict region (CR) for an aircraft within the MS of the ownship or target aircraft of FIG. 3 as computed and displayed by the current invention.

FIG. 4 is an isometric view of a conflict region (CR) for a second aircraft within the maneuver space (MS). The CR is preferably computed by a software module which uses known conflict probe algorithms (e.g. Niedringhaus et al.)

The conflict probe uses positions, flight plans, velocities, and the like of aircraft, other objects, or constraints, to predict pairwise conflicts a certain number of minutes, n, into the future. These conflict probe computations are used to generate the CRs of the present invention. Essentially, this strategy involves (a) centering an aircraft of interest at the middle of its own instantaneous maneuver space (i.e. imposing a coordinate system on this MS with the aircraft of interest at coordinate (current heading, current speed, current altitude)) and then (b) systematically examining the adjacent maneuver "cells" in search of conflict. The algorithm behaves as if it were the pilot asking the question "Suppose I now adopted some new maneuver combination of heading (x), speed (y), and altitude (z). Would that new (x, y, z) maneuver combination result in a conflict with any other object?" The conflict probe then (c) takes as input the (x, y, z) coordinates of this new, hypothesized maneuver and tests to see if it would result in any predicted conflicts. If it would, then that cell would become part of a CR. If not, it would classified as "free space".

This is the essence of the approach. In practice, the algorithm may be considerably more complex. For instance, the size of the "cells" may be varied from large to small to function first as a computationally rapid coarse-grained conflict filter in order to rapidly detect gross regions of the MS where conflicts might occur. This could then be followed by a fine-grained operation to precisely locate the conflict region boundaries.

Another approach is to use binary search techniques: It is axiomatic that all regions interior to a CR's boundaries will be conflictual by definition. Therefore it is only necessary to establish the boundaries of a CR and the interior will be known by smoothness constraint. So, in practice, given a cell known to be conflictual, the algorithm could look laterally a certain amount in a given dimension. If it failed to find conflict at that degree of lateral shift, it would reverse direction by half that amount. If it found conflict, it would reverse direction again and look a distance half again as large. As this technique proceeded, the shift distance would grow increasingly small until it fell below some critical threshold (e.g. ½ degree heading, 5 knots speed, or 200 feet altitude). At that point the algorithm's sub-loop would terminate and a conflict region boundary point (x, y, z) would be considered to have been found. The algorithm would then proceed in similar fashion along the remaining dimensions until the entire boundary of the CR was established.

Because it is mathematically of the order $(\log_2(x))^3$ rather than of order $x^3$, the binary search technique is generally much faster than the brute force techniques of examining a large number of cells one by one. For example, if each of the three dimensions is parsed into x=16 units, then binary search would be $16^3/(\log_2(16))^3$ or 64 times faster. The larger x becomes, the larger the computational savings.

A third technique available for use involves using each known CR boundary point as a "seed" to find adjacent conflict points. Smoothness constraints dictate that CRs are smooth both in MS and also across time. In other words, the (x, y, z) coordinates at time t of a boundary point comprise the maximum likelihood estimator for both the point $(x+dx, y+dy, z+dy)_t$ and $(x, y, z)_{t+dt}$, where d is some small shift (delta) in either space or time as conceptualized in the calculus. This "seed technique" could be implemented by maintaining a lookup table containing the locations of CRs at the previous iteration in time. In simple terms where they were a few seconds ago is most likely where they are (or are near) now.

Conflict regions are additive: No matter what the number of conflictual aircraft, each will express itself with its own unique CR. Whether these CRs overlap is of no concern. What is relevant is simply that the sum total of these CRs constitutes that portion of the maneuver space to be avoided. Anything outside these CRs is predicted to be a safe maneuver. The user of the invention, whether ATC or pilot, needs only to avoid each and every CR in order to select a maneuver guaranteed to be globally safe for at least the next n minutes.

Moreover, the CR implicitly defines a set of maneuvers to be considered as most efficient. These most-efficient maneuvers are represented by those regions of MS proximal to the CR but outside it by a small margin. This margin represents the smallest change in maneuver that will avoid conflict. Thus, this invention supplies information that lies at the very heart of efficiency, be it measured by time savings, fuel burn, or minimum deviation from original flight path.

FIG. 5 is a flow chart illustrating an example of the process of computing the maneuver space of FIG. 3 and any conflict zones of FIG. 4. The flow chart begins with step 502, which begins the iterative process, comprising six levels of iteration. The six levels are as follows: the first iteration is over time t, from the present to lookahead time T. Second, computations are done for each aircraft in the vicinity, from 1 to N-1. Third, in the case of an ATC system, computations are done with respect to all of the aircraft from j for j=i to N (this iteration is not necessary for a cockpit system, since such a system will compute maneuver space and conflict regions only for itself).

Fourth, the computations are done for cell heading from −h to h, where zero is the heading of the ownship (in the case of a cockpit system) or a default. Fifth, the computations are done for cell speed from −s to s, where zero is the speed of the ownship (in the case of a cockpit system) or a default. Sixth, computations are done for cell altitude −a to a, where zero is defined as the altitude of the ownship (in the case of a cockpit system) or a default.

Step 504 shows the first step of computations for each iteration. Inputs 504 to the computations include aircraft east-west position, north-south position, altitude, speed axis, heading axis, altitude axis, climb rate, and flight plan, based upon a database of stored flight plans and aircraft performance parameters 506. These inputs are modified in response to user initiated maneuvers or display parameter changes 508. In step 510, aircraft positions are calculated at time t.

In step 512, conflict regions between two aircraft, aircraft (i) and aircraft (j), are computed. Aircraft (i) may be either an ownship or a target ship. The results are provided to three-dimensional array 514, which updates display 608 (see FIG. 6).

If a conflict is found to exist in step 512, array 514 is flagged accordingly.

For the purposes of MS/CR display, therefore, querying array 514 will return the necessary real-time information to calculate and display the MS and any CR existing as a result between projected conflict between aircraft (I) and aircraft (j).

Display 608 is then updated, and calculations are continued. If no CR exists between aircraft (i) and aircraft (j), calculations are continued.

Variations of this process are possible. The computations are much simpler for a cockpit system, which must only calculate its own maneuver space and conflict regions. Many of the inputs shown may be provided only from database 506, rather than being updated in real time. The lookahead value n may be selected by the user. Limitations may be input for each maneuver space computation, or may be stored in memory. They include such items as maximum probable altitude, maximum probable speed, minimum probable speed, possible turning radius, etc. Database 506 may be read-only, or may be modifiable by maneuvers or parameter changes 508. Step sizes for the iteration may be chosen according to processing power and required accuracy.

See FIGS. 3, 4, 7, and 8 for examples of how the display might look. Recall that the x-axis represents the range of potentially achievable headings, the y-axis represents the range of potentially achievable ground speeds, and the z-axis represents the range of potentially achievable altitudes (for a given number of lookahead minutes, n).

Figure 6:
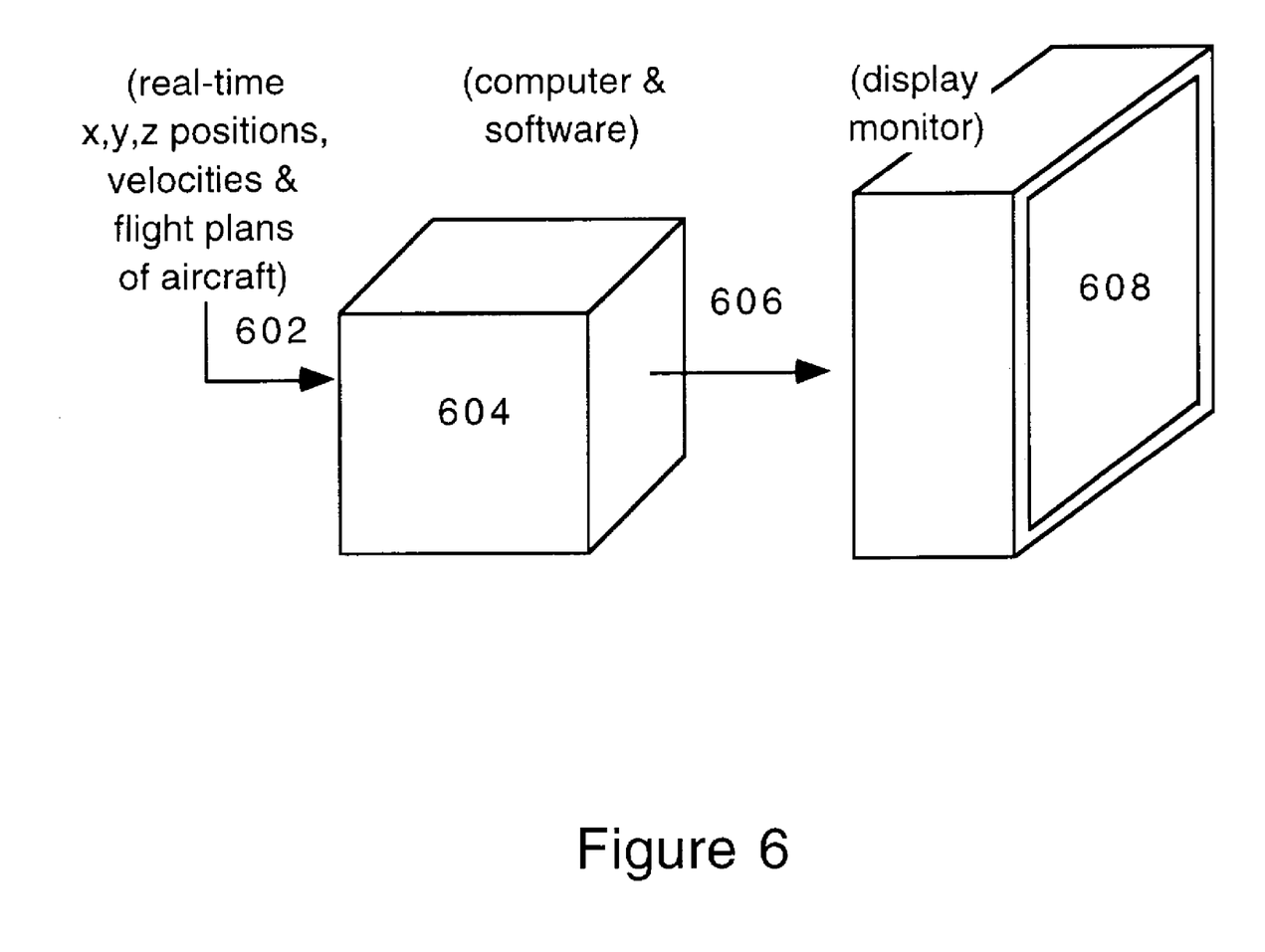
FIG. 6 is a block diagram of a display according to the present invention.

FIG. 6 is a block diagram of a display according to the present invention. Data input 602 consists of ownship and/or target aircraft information (506 and 508 in FIG. 5), and lookahead time n. Computer and software 604 performs the steps shown in FIG. 5, generating an array 514 consisting of data representing the MS for the ownship or possibly a target aircraft and CRs for traffic. Display 608 then displays the MS for the ownship or target aircraft and CRs for the traffic. See FIGS. 3, 4, 7, and 8 for examples of how the display might look. In the preferred embodiment, Display 608 will, on command, enable the user/pilot to display either polar coordinates (distance and heading from ownship or target aircraft) or absolute coordinates (longitude, latitude, and altitude) of the aircraft and objects that generate every CR in the MS. It will also enable the user/pilot to display either polar coordinates or absolute coordinates for a specific CR in the MS.

Figure 7:
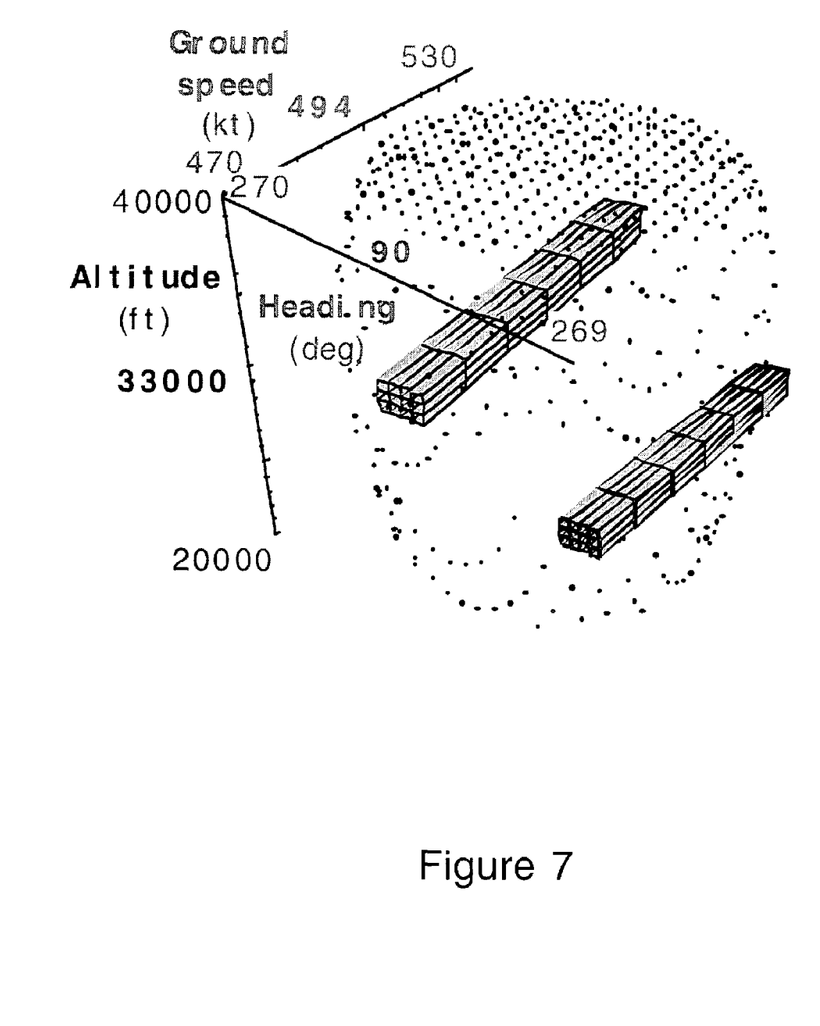
FIG. 7 is a three dimensional view of the MS for an ownship or target aircraft displayed simultaneously with the CR produced by another aircraft as computed and displayed by the current invention.

FIG. 7 is an isometric view of MS for an ownship or target aircraft and two CRs with other aircraft. This is the display that would be viewed by either a air traffic controller (ATC) who will instruct the pilot of the target aircraft on a maneuver to be executed, or by the pilot(s) of an ownship. In either case, the user of the invention, whether ATC or pilot, must select a maneuver that avoids each and every conflict region. In a preferred embodiment, the user of the invention would simply double-click a non-conflicting region with a cursor or cross hairs, and the new heading, altitude, and/or speed would be displayed.

The ATC version of the invention and its display, FIG. 7, may provide the option of automatically uploading the heading, altitude, and/or speed to the pilot of the target aircraft radio datalink. Thus, collision detection and maneuver solution are reduced to a single step.

If a pilot is using the cockpit version of the invention and its display, FIG. 7, the new heading and speed could be transmitted directly to the ownship's autopilot. In this case, maneuver solution and maneuver execution are reduced to a single step.

Figure 8:
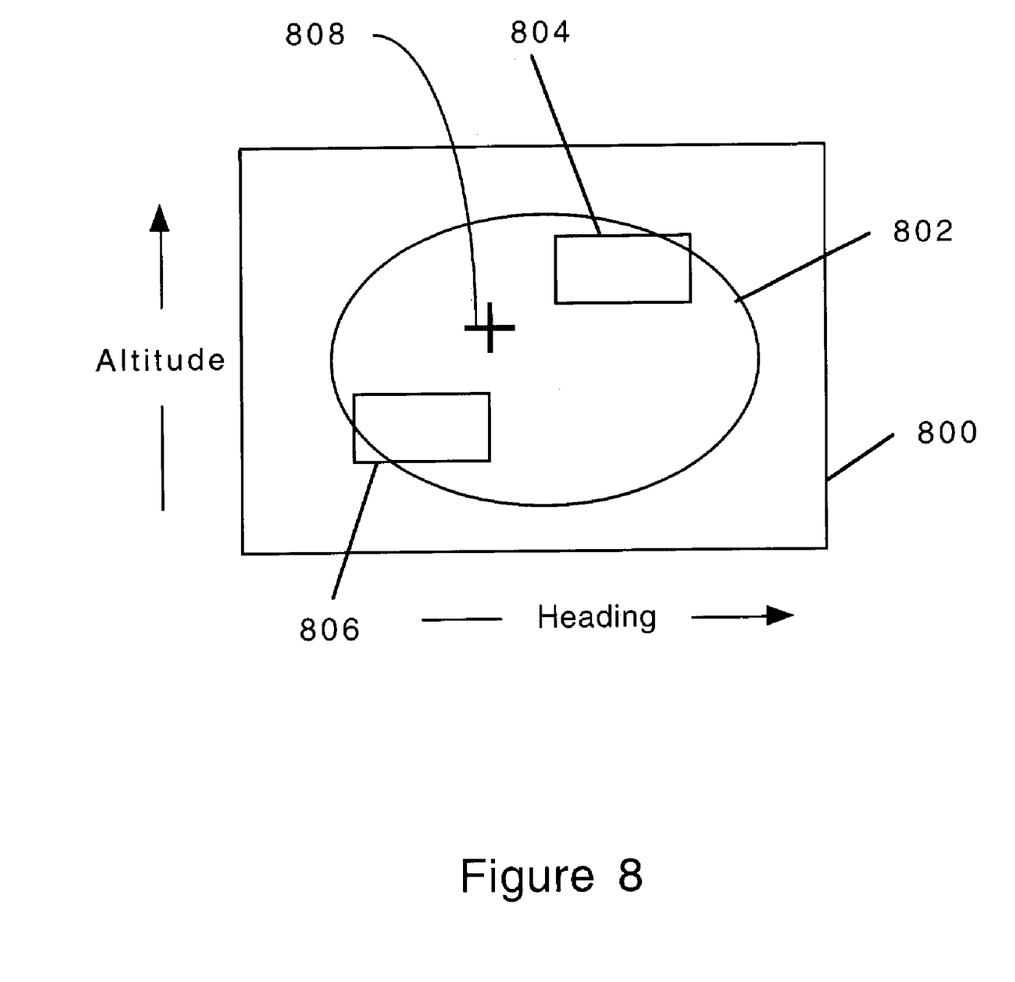
FIG. 8 is a plan view illustrating a two dimensional version of the present invention.

FIG. 8 is a plan view illustrating a two-dimensional version of the present invention. The display of FIG. 8 removes the ground speed variable from the display shown in FIG. 7. Since pilots rarely want to significantly change their airspeed, the most desirable maneuvers alone are shown in this 2-D display.

Display 800 displays a slice through the MS 802 of the ownship or target aircraft, CRs 804 and 806 for traffic, and cross hairs 808, used to select a maneuver for the ownship or target aircraft. The x-axis represents achievable heading, and the y-axis represents achievable altitude (for a given number of lookahead minutes, n, and a given ground speed). In the preferred embodiment, the ground speed may be changed, for example by a slide switch 810. Then, if a change in speed is required, a display for the new speed is generated.

While the exemplary preferred embodiments of the present invention are described herein with particularity, those skilled in the art will appreciate various changes, additions, and applications other than those specifically mentioned, which are within the spirit of this invention.

What is claimed is:

1. A method, comprising:
providing a multidimensional representation of a conceptual space that defines a range of unique maneuvers for an aircraft in flight, the conceptual space including a first dimension represented by a first coordinate range of different heading values for the aircraft and a second dimension represented by a second coordinate range of different altitude values for the aircraft, each different combination of one of the heading values and one of the altitude values representing a different one of the unique maneuvers of the aircraft and corresponding to a unique region of the conceptual space;
determining a subset of the maneuvers predicted to place the aircraft in conflict with one or more objects; and
displaying the conceptual space with a visual distinction made between one or more conflict regions and a conflict avoidance region, the one or more conflict regions being representative of the subset of the maneuvers predicted to place the aircraft in conflict with the one or more objects and the conflict avoidance region being representative of at least one other of the maneuvers predicted to avoid conflict with the object.

2. The method of claim 1, which includes:
determining a margin relative to the one or more conflict regions to enhance maneuver efficiency; and
selecting a subset of the one or more other of the maneuvers predicted to avoid conflict with the one or more objects and that are within the margin.

3. The method of claim 1, wherein the conceptual space includes a third dimension representing a third coordinate range of different speed values of the aircraft, and each different combination of the one of the heading values, the one of the altitude values, and one of the speed values represents the different one of the maneuvers.

4. The method of claim 1, which includes selecting one of the other of the maneuvers corresponding to the conflict avoidance region and executing the one of the other of the maneuvers.

5. The method of claim 1, wherein the one or more objects are each another aircraft, terrain, weather, or special-use airspace.

6. The method of claim 1, wherein said determining includes:
establishing a lookahead time; and
calculating present and predicted future position of the aircraft and the one or more objects relative to the representation based on the lookahead time.

7. A computing and displaying apparatus, comprising:
means for defining a multidimensional conceptual representation of a number of maneuvers for an aircraft in flight, the representation including a first dimension representing a directional range of different heading values for the aircraft and a second dimension representing an altitude range of different altitude values for the aircraft, each different combination of one of the heading values and one of the altitude values representing a unique one of the maneuvers;

means for determining a subset of the maneuvers predicted to place the aircraft in conflict with one or more objects based on the representation; and means for displaying a conceptual space including a first coordinate range to represent the first dimension and a second coordinate range to represent the second dimension, the conceptual space visually presenting one or more conflict regions and a conflict avoidance region, the one or more conflict regions being representative of the subset of maneuvers that place the aircraft in conflict with the one or more objects and the conflict avoidance region being representative of the maneuvers that each avoid conflict with the one or more objects.

8. The apparatus of claim 7, wherein the representation of said defining means further includes a third dimension corresponding to aircraft speed.

9. A method, comprising:

with a computer, defining a multidimensional conceptual space that represents several unique maneuvers for an aircraft in flight, the conceptual space including a first coordinate range of directional values each representing a different direction for the aircraft and a second coordinate range of different altitude values each representing a different altitude for the aircraft, each different combination of one of the directional values and one of the altitude values representing a different one of the maneuvers of the aircraft and corresponding to a different region of the conceptual space;

with the computer, determining a subset of the maneuvers each predicted to place the aircraft in conflict with one or more objects; and displaying the conceptual space with a visual distinction between one or more conflict regions and a conflict avoidance region, the one or more conflict regions being representative of the subset of the maneuvers predicted to place the aircraft in conflict with the one or more objects and the conflict avoidance region being representative of at least one other of the maneuvers predicted to avoid conflict with the one or more objects.

10. The method of claim 9, which includes maneuvering the aircraft in accordance with a selected one of the other of the maneuvers to avoid conflict the one or more objects.

11. The method of claim 9, wherein the one or more objects include a plurality of different aircraft in flight.

12. The method of claim 11, wherein the conceptual space includes a third coordinate range of different speed values of the aircraft, each different combination of the one of the directional values, the one of the altitude values, and one of the speed values represents a different one of the unique maneuvers.

13. The method of claim 12, which includes selecting one of the other of the maneuvers corresponding to the conflict avoidance region and executing the one of the other of the maneuvers.

14. The method of claim 9, wherein the directional values each correspond to a different heading of the aircraft.

15. The method of claim 14, wherein said determining includes:

establishing a lookahead time; and calculating present and predicted future position of the aircraft and the one or more objects relative to the conceptual space based on the lookahead time.

16. The method of claim 11, which includes:

selecting a margin relative to the one or more conflict regions to enhance maneuver efficiency; and determining a different subset of the maneuvers predicted to avoid conflict with the one or more objects that are within the margin.

17. The method of claim 9, wherein:

the conceptual space includes a third dimension representing a third coordinate range of different speed values of the aircraft, each different combination of the one of the directional values, the one of the altitude values, and one of the speed values represents the different one of the unique maneuvers;

the one or more objects are each another aircraft, terrain, weather, or special-use airspace; and the directional values each correspond to a different heading of the aircraft.

* * * * *